United States Patent [19]

Bonafé

[11] Patent Number: 5,124,700
[45] Date of Patent: Jun. 23, 1992

[54] SYSTEM FOR GENERATING ON BOARD AN AIRCRAFT AN ALARM SIGNAL SHOULD ANY ANOMALY OCCUR DURING TAKE-OFF

[75] Inventor: Jean-Louis Bonafé, Toulouse, France

[73] Assignee: Aerospatiale Societe Nationale Industrielle, Paris, France

[21] Appl. No.: 506,919

[22] Filed: Apr. 9, 1990

[30] Foreign Application Priority Data

Jun. 20, 1989 [FR] France .................. 89 08177

[51] Int. Cl.$^5$ .......................................... G08B 21/00
[52] U.S. Cl. .................. 340/959; 73/178 T; 364/427
[58] Field of Search .............. 340/959, 963, 969; 73/178 T; 364/427; 244/191

[56] References Cited

U.S. PATENT DOCUMENTS

| | | | |
|---|---|---|---|
| 3,034,096 | 5/1962 | Craddock | 364/427 |
| 3,504,335 | 3/1970 | Hall et al. | 340/959 |
| 4,122,522 | 10/1978 | Smith | 340/959 |
| 4,251,868 | 2/1981 | Aron et al. | |
| 4,773,015 | 9/1988 | Leland et al. | |

FOREIGN PATENT DOCUMENTS

| | | |
|---|---|---|
| 0025614 | 3/1981 | European Pat. Off. |
| 0166487 | 11/1987 | European Pat. Off. |
| WO8501372 | 3/1985 | PCT Int'l Appl. |
| 1602477 | 11/1981 | United Kingdom |

Primary Examiner—Jin F. Ng
Assistant Examiner—Brent A. Swarthout
Attorney, Agent, or Firm—Marshall, O'Toole, Gerstein, Murray & Bicknell

[57] ABSTRACT

A system for generating on board an aircraft an alarm signal should an anomaly occur during take-off includes: a circuit for delivering signals representing the theoretical and real accelerations of the aircraft at a given moment; a calculator for calculating the expression:

$$D_2 = D_2 t + (Vat^2 - V_{12}t^2)/2 \gamma_1 t$$

in which: $\gamma_1 t$ is the real acceleration of the aircraft at the moment t, $V_{11}t$ is its real speed, Vat is its theoretical speed, $D_1 t$ is the real distance covered by the aircraft at the moment t, and $D_1$ is the real forecast distance covered by the aircraft when $V_{11t}$ shall equal Vat, as well as the ratio:

$$D_1/Dat$$

in which Dat is the theoretical distance covered by the aircraft at the moment t; a comparator for comparing the ratio $D_1$/Dat with a predetermined threshold value S guaranteeing a minimal safety distance, for the braking and stopping of the aircraft, and for providing an information signal to an alarm able to emit an alarm signal when the ratio $D_1$/Dat is greater than or equal to the threshold value.

8 Claims, 4 Drawing Sheets

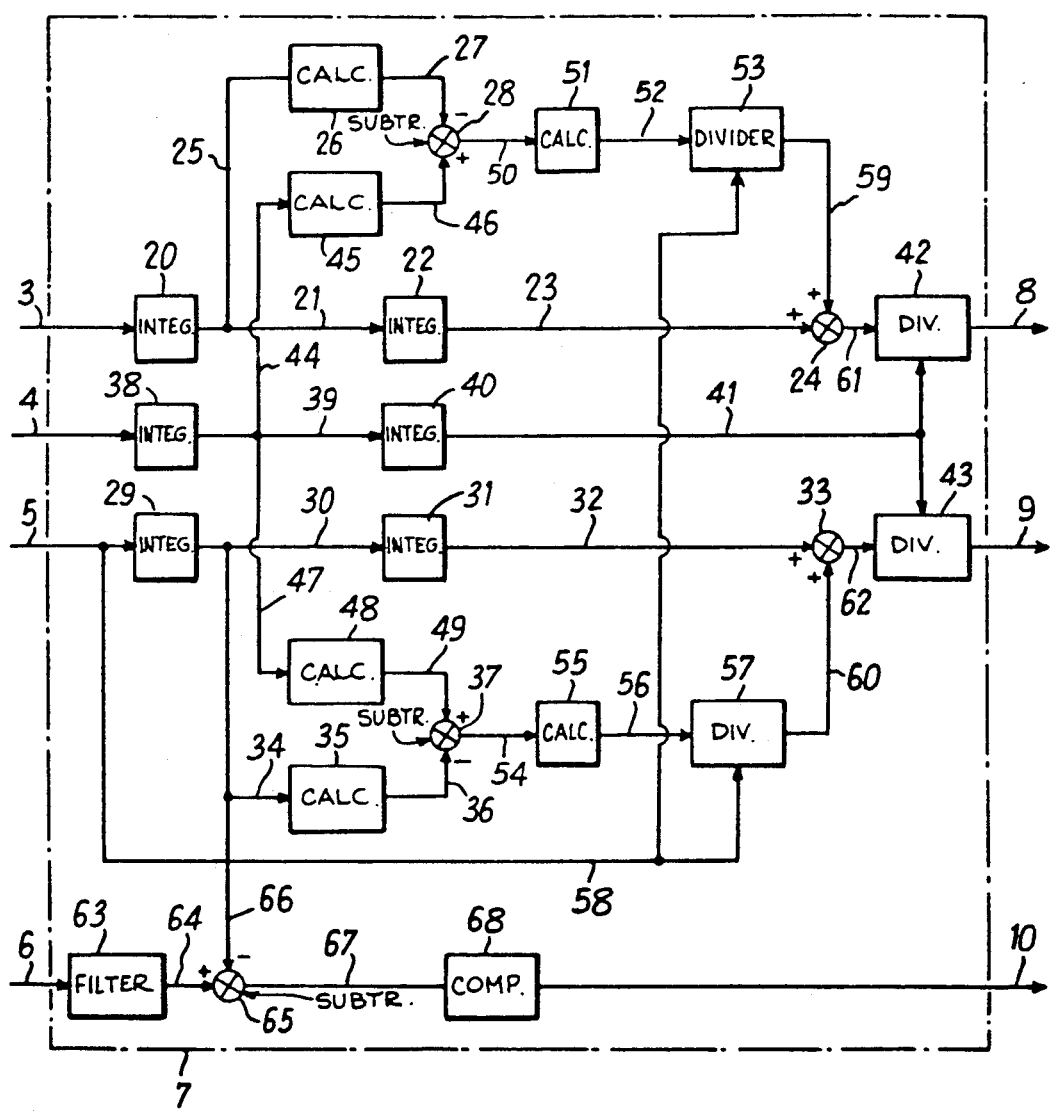

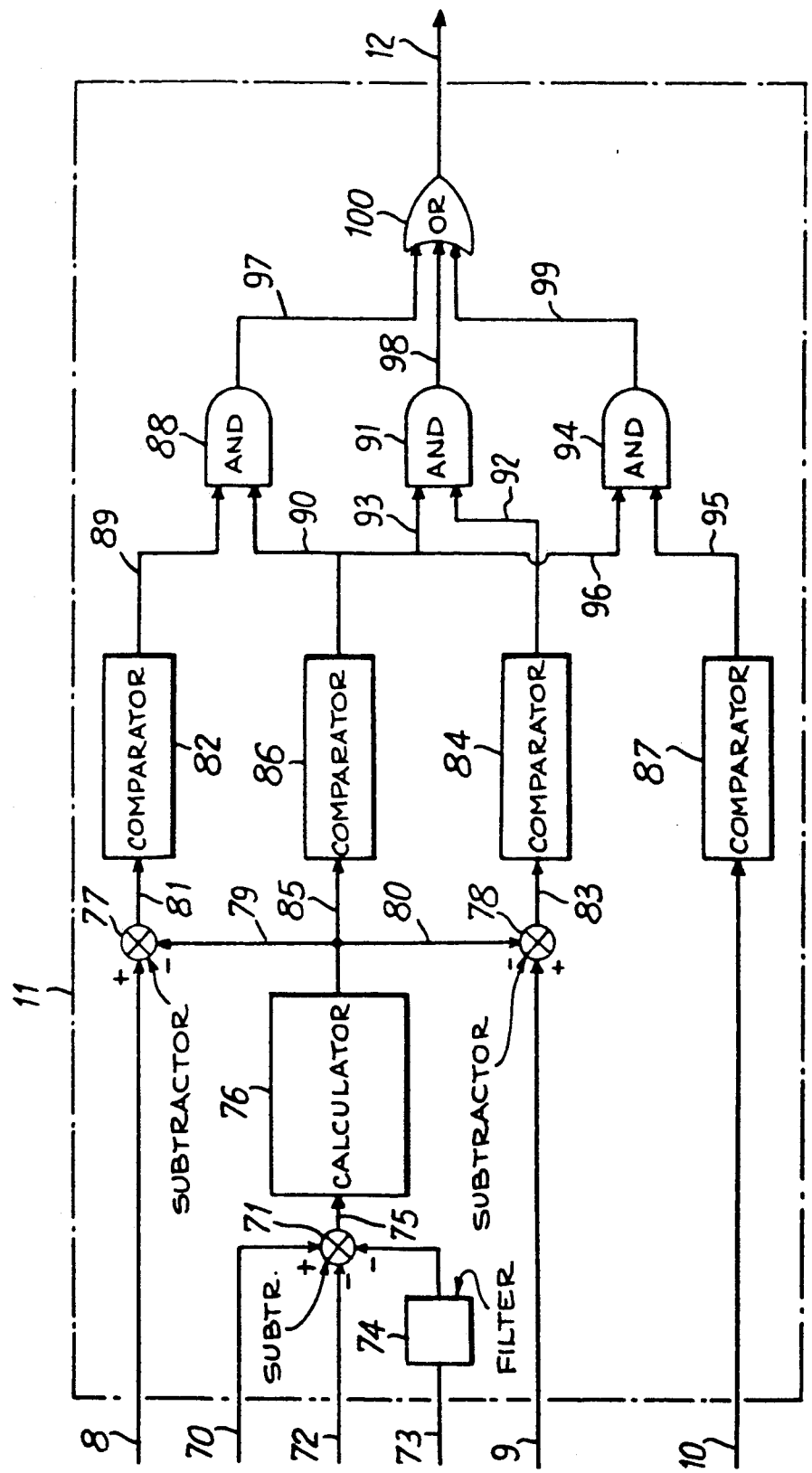

SYSTEM FOR GENERATING ON BOARD AN AIRCRAFT AN ALARM SIGNAL SHOULD ANY ANOMALY OCCUR DURING TAKE-OFF

FIELD OF THE INVENTION

The present invention concerns a system for generating on board an aircraft an alarm signal in the event of any anomaly occuring during take-off.

BACKGROUND OF THE INVENTION

The takeoff procedure, from releasing the brakes until the aircraft actually takes off, constitutes a delicate aircraft operating stage during which, owing to losses of performance and changes as regards the direction and strength of the wind or for other reasons, accidents or incidents, whose probability has been assessed at about $10^{-6}$ per take-off, may possibly occur. Accordingly, in order to improve safety, it would be essential to provide the aircrew at the right time with accurate specific information enabling the aircrew to decide on whether or not to interrupt or correct the take-off procedure before the aircraft travelling on the runway reaches a critical speed obtained by a theoretical calculation, said speed being defined as the speed at which take-off may be interrupted and beyond which take-off must be continued.

So as to more readily understand this notion of critical speed denoted subsequently by $V_1$, it would be first of all proper to define various distances characteristic of an airport runway. In fact, the runway and its immediate surroundings can be divided into several zones depending on their function:

the length of the available runway, which is the runway length able to accomodate the aircraft in all use conditions, the stopping zone, which is an extension of the actual runway able to be used as an aerodrome taxi circuit on the ground, but also allowing for breaking should the take-off procedure be interrupted, the clear zone, which is the zone in the immediate extended part of the runway, said extended part being able to be taken into account in calculating the takeoff distance.

Account is then taken of the various distances relating to the take-off procedure for a given aircraft:

the running distance, which is the distance, in relation to the ground, covered by the aircraft between releasing the brakes and that half of the "segment" defined by the point reached by the aircraft at the speed when it leaves the ground and the point corresponding to the rise of the aircraft to an altitude defined in the certification regulations, namely 35 feet (10.7 meters). It needs to be less than or equal to the available runway length;

the take-off distance, which is the distance, in relation to the ground, covered by the aircraft between releasing the brakes and the rise of the aircraft to said altitude of 35 feet. Should an engine breakdown occur at $V_1+\epsilon$ ($\epsilon$ being the mathematical sign denoting an immeasurably small value), it needs to be less than or equal to the sum:

available runway length + clear zone;

the acceleration/stopping distance, which is the distance covered by the aircraft between releasing the brakes and the stoppage of the aircraft by using its own brakes should an engine breakdown occur at $V_1-\epsilon$. This distance needs to be at the most equal to the sum:

available runway length + stoppage zone.

From the moment the aircraft reaches the critical speed $V_1$ defined by calculation before take-off and set for take-off, the take-off procedure must strictly be continued. In fact, in the opposite case, the stoppage of the aircraft could not be obtained before the end of the stoppage zone, as defined above. Up until now, the pilot compares the speed of the aircraft with said critical speed. The critical speed $V_1$ is a speed defined with respect to the air, which results in a first risk when the wind suddenly varies during take-off. However, independently of any wind change, although it is relatively simple for the pilot to verify the notion of the speed $V_1$, in actual fact this notion is linked to a notion of distance, currently unknown to the aircrew, which is clearly a critical parameter as regards take-off. Consequently, any deterioration of the performances of the aircraft with respect to theoretical performances implies that the aircraft shall reach said critical speed after having covered a distance longer than the calculated theoretical distance corresponding to this critical speed. In truth, as things currently stand, the pilot who decides to interrupt the take-off procedure at $V_1-\epsilon$ may not be certain that he could stop the aircraft without risking leaving the runway.

SUMMARY OF THE INVENTION

The object of the present invention is to overcome these drawbacks and concerns a system making it possible to generate on board an aircraft an alarm signal should an anomaly occur during take-off, said system being adapted so that the pilot, if need be, can safely decide to modify or interrupt the take-off procedure, that is by being certain in the latter case that he has available sufficient runway length so as to stop the aircraft within the runway limits.

To this effect, the system of the invention to generate on board an aircraft an alarm signal should an anomaly occur during take-off, before the aircraft has reached a critical running speed until which the take-off procedure can be modified or interrupted and beyond which take-off must be continued, is notable in that it comprises:

means able to deliver signals representing both the theoretical and real accelerations of the aircraft at a given moment, means to calculate the expression:

$$D_1 = D_1 t + (Vat^2 - V_{11}t^2)/2\gamma_1 t$$

in which:
$\gamma_1 t$ is the real acceleration of the aircraft at the moment t,
$V_{11}t$ is the real speed of the aircraft at the moment t,
$Vat$ is the theoretical speed of the aircraft at the moment t,
$D_1 t$ is the real distance covered by the aircraft at the moment t, and
$D_1$ is the forecast real distance covered by the aircraft when $V_{11}t$ shall equal $Vat$, as well as the ratio:

$$D_1/Dat$$

in which:
$D_1$ is as defined above, and

Dat is the theoretical distance covered by the aircraft at the moment t, means for comparing the ratio $D_1/Dat$ with a predetermined threshold S guaranteeing a minimum safety distance as regards the braking and stopping of the aircraft, and for providing an information signal to alarm means able to emit an alarm signal when said ratio $D_1/Dat$ is greater than or equals said threshold.

Thus, it is possible to forecast at any moment the distance covered by the aircraft when its speed shall have reached the theoretical speed at this moment, that is the speed calculated for this moment in calculating theoretical take-off distances. The calculation is permanent from 0 to $V_1$ so that the forecasting is embodied until the decision point. When the forecast distance exceeds the theoretical distance of a predetermined threshold, the alarm is triggered and the pilot is able to safely stop the aircraft, that is without risking the aircraft leaving the runway, due to the fact that the distance effectively covered by the aircraft at this moment is by definition sufficiently less than the theoretical distance, which guarantees a stoppage of the aircraft inside the runway limits, as far as $V_1$. In other words, the alarm shall have been triggered sufficiently in advance since it shall be activated by calculating at a given moment the distance covered by the aircraft in a future situation, which makes it possible to retain a sufficient margin of safety in terms of distance and speed. It is to be noted that the term "alarm signal" means as well "alert signal" and that the system of the invention, besides alarm signals, is able to provide also "information" signals, when said threshold is not reached.

In the case of an energy-savings take-off procedure, in which the maximum power of the aircraft engines is not used, it may be advantageous to generate a signal, no longer according to "real" parameters, but according to "realizable" parameters. To this end, according to another characteristic of the invention, the system further includes:

means able to deliver signals representative of the realizable acceleration of the aircraft at a given moment, means to calculate the expression:

$$D_2 = D_2t + (Vat^2 - V_{12}t^2)/2\gamma_1 t$$

in which:

$\gamma_1 t$ is the real acceleration of the aircraft at the moment t, $V_{12}t$ is the realizable speed of the aircraft at the moment t, Vat is the theoretical speed of the aircraft at the moment t, $D_2 t$ is the realizable distance covered by the aircraft at the moment t, and $D_2$ is the forecast realizable distance covered by the aircraft when $V_{12}t$ shall equal Vat, as well as the ratio:

$$D_2/Dat$$

in which:

$D_2$ is as defined above, and

Dat is the theoretical distance covered by the aircraft at the moment t, said comparison means making it possible to compare the $D_2/Dat$ ratio with said predetermined threshold S, and said alarm means being able to emit an alarm signal when said $D_2/Dat$ ratio is greater than or equals said threshold.

According to another characteristic of the invention, the system further includes means to determine the variation $\Delta W$ of the longitudinal component of the wind from the expression $Wx = VTAS - V_{11}t$, in which Wx is the longitudinal component of the wind, VTAS the aerodynamic speed and $V_{11}$ t the real speed of the aircraft, said comparison means making it possible to compare $\Delta W$ with a predetermined threshold $\Delta WS$, and said alarm means being able to emit an alarm signal when $\Delta W$ is greater than or equals said threshold $\Delta WS$.

Again, according to another characteristic of the invention, said threshold S, when compared with the $D_1/Dat$ and/or $D_2/Dat$ ratio, is variable and reduces when the difference $\Delta V$ between the critical speed and the speed reached by the aircraft reduces.

Preferably, said threshold S is defined by the function $S = a \Delta V + b$, a and b being constants compatible with the theoretical margins of the take-off calculation.

According to another characteristic of the invention, the system comprises sampling means making it possible to obtain a series of numerical values of the theoretical, real and realizable accelerations and of the aerodynamic speed.

BRIEF DESCRIPTION OF THE DRAWINGS

The figures of the accompanying drawing shall clearly reveal how the invention may be embodied.

FIG. 2 gives the diagram of an embodiment of the calculation device used in the system of the invention.

FIG. 3 shows the diagram of an example for embodying a device for providing an information signal used in the system of the invention.

DETAILED DESCRIPTION OF THE PREFERRED EMBODIMENTS

Figure 1:
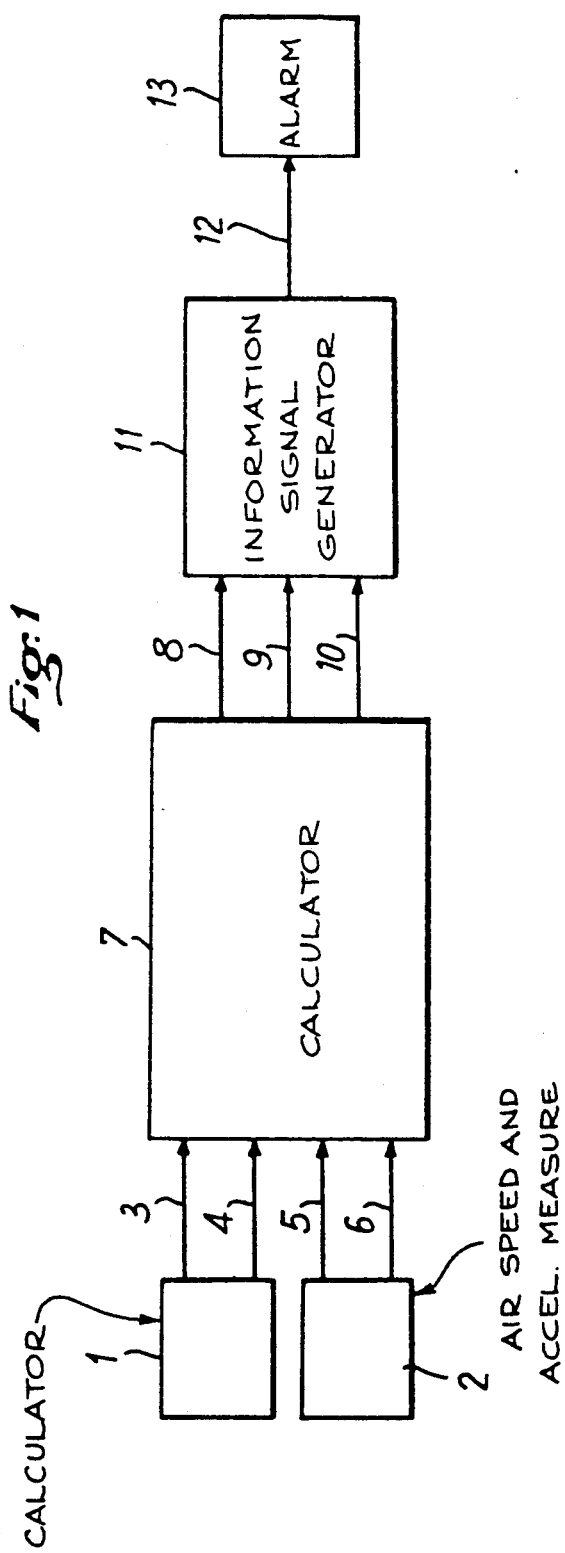
FIG. 1 is a synoptic skeleton diagram of the system according to the invention.

With reference now to the synoptic diagram of FIG. 1, the system according to the invention includes a first calculation device 1 to calculate the theoretical acceleration $\gamma$ at corresponding to the acceleration the pilot requires from the aircraft engines, and the realizable acceleration $\gamma_2 t$, which the engines are able to supply having regard to the number of revolutions, or the pressure observed on each of them, of the aircraft. In order to effect this, the calculation device 1 receives a certain number of parameters depending on the type of aircraft in question, as well as the engines provided on said aircraft, and, on the basis of this data, is able in a known way to work out said accelerations.

The real acceleration $\gamma_1 t$ and the aerodynamic speed VTAS are respectively measured by the inertial unit and the anemometric instrument system, this being schematized as shown on FIG. 1 by the device 2.

The outputs of the device 1, where the accelerations $\gamma$ at and $\gamma_2 t$ appear, are connected by the respective lines 3 and 4 to inputs of a second calculation device 7 described in detail opposite FIG. 2. Similarly, the outputs of the device 2 where the acceleration $\gamma_1 t$ and the speed VTAS appear, are connected by the respective lines 5 and 6 to other inputs of the calculation device 7.

The outputs of the device 7, where the values $D_1/Dat$, $D_2/Dat$ and $\Delta W$ appear, are connected by the respective lines 8, 9 and 10 to a device for providing an information signal 11, said device being described in detail opposite FIG. 3, and whose output is connected by the line 12 to the alarm means 13.

It should be reminded that:

$\gamma_1 t$ is the real acceleration of the aircraft at the moment t, $V_{11}t$ is the real speed of the aircraft at the moment t, $V_{12}t$ is the realizable speed of the aircraft at the moment t, Vat is the theoretical speed of the aircraft at the moment t, $D_1t$ is the real distance covered by the aircraft at the moment t, $D_2t$ is the realizable distance covered by the aircraft at the moment t, $D_1$ is the forecast real distance covered by the aircraft when $V_{11}t$ shall equal Vat, $D_2$ is the forecast realizable distance covered by the aircraft when $V_{12}t$ shall equal Vat.

$D_1$ and $D_2$ result from application of the fundamental relation of kinematics. Thus:

$$D_1 = D_1 t + \tfrac{1}{2}\gamma_1 t \cdot \Delta t^2 + V_{11} t \cdot \Delta t$$

an expression in which $\Delta t$ is the time required so that $V_{11}t = Vat$, in other words so that:

$$\Delta t = (Vat - V_{11}t)/\gamma_1 t$$

which results in:

$$D_1 = D_1 t + (Vat^2 - V_{11}t^2)/2\gamma_1 t$$

Similarly:

$$D_2 = D_2 t + \tfrac{1}{2}\gamma_1 t \cdot \Delta t^2 + V_{12} t \cdot \Delta t$$

an expression in which $\Delta t$ is the time required so that $V_{12}t = Vat$, in other words so that:

$$\Delta t = (Vat - V_{12}t)/\gamma_1 t$$

which results in:

$$D_2 = D_2 t + (Vat^2 - V_{12}t^2)/2\gamma_1 t$$

With reference now to FIG. 2 showing an embodiment of the calculation device 7, the realizable acceleration $\gamma_2 t$, directed by the line 3, is applied at the input of an integrator 20 able to provide at its output the realizable speed $V_{12}t$ applied by the line 21 to an integrator 22 able to supply at its output the realizable distance $D_2t$ applied by the line 23 to one of the inputs of an adding device 24. In addition, via the line 25, the realizable speed $V_{12}t$ is applied to a calculator 26 able to supply at its output the value $V_{12}t^2$ applied by the line 27 to the negative input of a subtracter 28.

Similarly, the real acceleration $\gamma_1 t$, directed by the line 5, is applied to the input of an integrator 29 able to supply at its output the real speed $V_{11}t$ applied by the line 30 to an integrator 31 able to supply at its output the real distance $D_1t$ applied by the line 32 to one of the inputs of an adding device 33. Furthermore, the real speed $V_{11}t$ is applied by the line 34 to a calculator 35 able to supply at its output the value $V_{11}t^2$ applied by the line 36 to the negative input of a subtracter 37.

In addition, the theoretical acceleration $\gamma a$, directed by the line 4, is applied to the input of an integrator 38 able to supply at its output the theoretical speed Vat applied by the line 39 to an integrator 40 able to supply at its output the theoretical distance Dat applied by the line 41 to the outputs, each corresponding to the denominator, of the dividers 42 and 43. Moreover, the theoretical speed Vat is applied by the line 44 to a calculator 45 able to supply at its output the value $Vat^2$ applied by the line 46 to the positive input of the subtracter 28. The theoretical speed Vat is also applied by the line 47 to a calculator 48 able to supply at its output the value $Vat^2$ applied by the line 49 to the positive input of the subtractor 37.

The subtracter 28, which supplies at its output the value $(Vat^2 - V_{12}t^2)$, is connected via the line 50 to a calculator 51 able to supply at its output the value $(Vat^2 - V_{12}t^2)/2$ applied by the line 52 to the input corresponding to the numerator of a divider 53. Similarly, the subtractor 37, which supplies at its output the value $(Vat^2 - V_{11}t^2)$, is connected via the line 54 to a calculator 55 able to supply at its output the value $(Vat^2 - V_{11}t^2)/2$ applied by the line 56 to the input, corresponding to the numerator, of a divider 57.

The real acceleration $\gamma_1 t$ is applied by the line 58 to the inputs, each corresponding to the denominator, of the dividers 53 and 57. The divider 53, which supplies at its output the value $(Vat^2 - V_{12}t^2)/2\gamma_1 t$, is connected by the line 59 to the adding device 24, whereas the divider 57, which supplies at its output the value $(Vat^2 - V_{11}t^2)/2\gamma_1 t$, is connected by the line 60 to the adding device 33. The adding device 24, which supplies at its output the value $D_2t + (Vat^2 - V_{12}t^2)/2\gamma_1 t$, is connected by the line 61 to the input corresponding to the numerator of the divider 42, whereas the adding device 33, which supplies at its output the value $D_1t + (Vat^2 - V_{11}t^2)/2\gamma_1 t$, is connected by the line 62 to the input corresponding to the numerator of the divider 43.

At the outputs (lines 8 and 9) of the dividers 42 and 43, the following ratios appear respectively:

$D_2/Dat$ $D_1/Dat$ in which, as already indicated:

$D_1$ is the forecast real distance covered by the aircraft when $V_{11}t$ shall equal Vat, and $D_2$ is the forecast realizable distance covered by the aircraft when $V_{12}$ shall equal Vat.

The aerodynamic speed VTAS, directed by the line 6 and filtered in the filter 63, is applied by the line 64 to the positive input of a subtracter 65, the real speed $V_{11}t$ being applied by the line 66 to the negative input of the latter. Thus, the longitudinal component of the wind $VTAS - V_{11}t = Wx$ is determined, applied by the line 67 to the device 68 and whose variation is to be compared with a specific threshold, as shall be seen subsequently.

Furthermore, the calculation device 7 may upstream include sampling means (not shown) making it possible to obtain a set of numerical values of theoretical, real and realizable accelerations at a sampling period of, for example, 100 milliseconds (hence the time notion t which appears on all the parameters of the calculation).

Reference is now made to FIG. 3 showing an embodiment of a device for providing an information signal 11.

As indicated above, the calculation device 7 makes it possible to determine three "observers":

1) Forecast real distance/Theoretical distance namely $D_1t/Dat$
2) Forecast realizable distance/Theoretical distance namely $D_2t/Dat$
3) Wind variation namely $\Delta W$ One solution may consist of comparing these different observers with a fixed predetermined threshold. However, as regards the observers 1) and 2), it is clear that such a threshold may be higher when the speed of the aircraft is still "much lower" than the critical speed as defined previously, but must be less high when the speed of the aircraft approaches the critical speed. Furthermore, it would be advantageous for the alert to be triggered at the latest, for example, before the aircraft reaches the forecast critical speed. The embodiment of the device 11 takes account of these different remarks.

Accordingly, the critical speed is applied by the line 70 to the positive input of a subtracter 71, a speed constant taking account of said "temporal alert threshold" (one second) and the speed of the aircraft filtered at 74 being applied by the respective lines 72 and 73 to the negative inputs of said subtracter. The output $\Delta V$ of the subtracter 71 is connected by the line 75 to the input of a calculator 76 whose output is a threshold value S, a variable as illustrated on FIG. 4.

The threshold S is an increasing linear function with the form of: $S = a\Delta V + b$, in which a and b are constants compatible with the theoretical margins of the take-off calculation.

Figure 4:
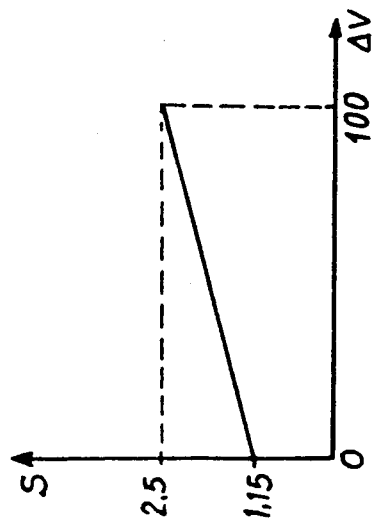
FIG. 4 shows the variation curve of the threshold of the alarm signal according to the speed of the aircraft.

By way of example, FIG. 4 shows the function S concerning the speed interval, expressed in knots (1852 m/h) from 0 to 100. In this particular case, if $\Delta V = 0$, $S = 1.15$ and if $\Delta V = 100$, $S = 2.5$; the threshold S may thus be expressed by the formula $S = 0.0135 \Delta V + 1.15$. This means that an excess of "forecast compared with theory" of 150% may be tolerated at the start of take-off, an excess being only no more than 15% approaching the critical speed, this of course merely being one possible example from other possible examples.

In addition, the value $D_2t/Dat$ is applied by the line 8 to the positive input of a subtracter 77, the threshold value S determined in the device 76 being applied by the line 79 to the negative input of said subtracter. Similarly, the value $D_1t/Dat$ is applied by the line 9 to the positive input of a subtracter 78, said threshold value S being applied by the line 80 to the negative input of said subtracter.

The value $D_2t/Dat - S$ is applied by the line 81 to the input of a comparator 82 whose output is 1 if $D_2t/Dat - S \geq 0$, and 0 if $D_2t/Dat - S < 0$. Similarly, the value $D_1t/Dat - S$ is applied by the line 83 to the input of a comparator 84 whose output is 1 if $D_1t/Dat - S \geq 0$, and 0 if $D_1t/Dat - S < 0$. Moreover, the value S is applied by the line 85 to the input of a comparator 86 whose output is 1 when S exceeds a predetermined value, for example equal to 1.15.

In addition, the wind variation, directed by the line 10, is supplied at the input of a comparator 87 whose output is 1 if the wind variation is greater than a predetermined threshold for, for example, 5 seconds, this wind variation clearly corresponding to a "spoiler" wind.

The output of the comparator 82 and the output of the comparator 86 are applied respectively by the lines 89 and 90 to a first logic gate AND 88. The output of the comparator 84 and the output of the comparator 86 are applied respectively by the lines 92 and 93 to a second logic gate AND 91. The output of the comparator 87 and the output of the comparator 86 are applied respectively by the lines 95 and 96 to a third logic gate AND 94. The outputs of the AND gates 88, 91 and 94 are applied by the respective lines 97, 98 and 99 to the inputs of a logic gate OR whose output 12 is connected to the alarm means 13.

Thus, the alert shall be triggered when at least one of the three previously defined "observers" gives a non-nil signal to the gates 88, 91 or 94, an alert which is clearly displayed on the instrument panel. This alert shall be disactivated upon unloading of the landing gear and the take-off monitors shall then be restored to an initialization condition and disactivated.

Figure 5:
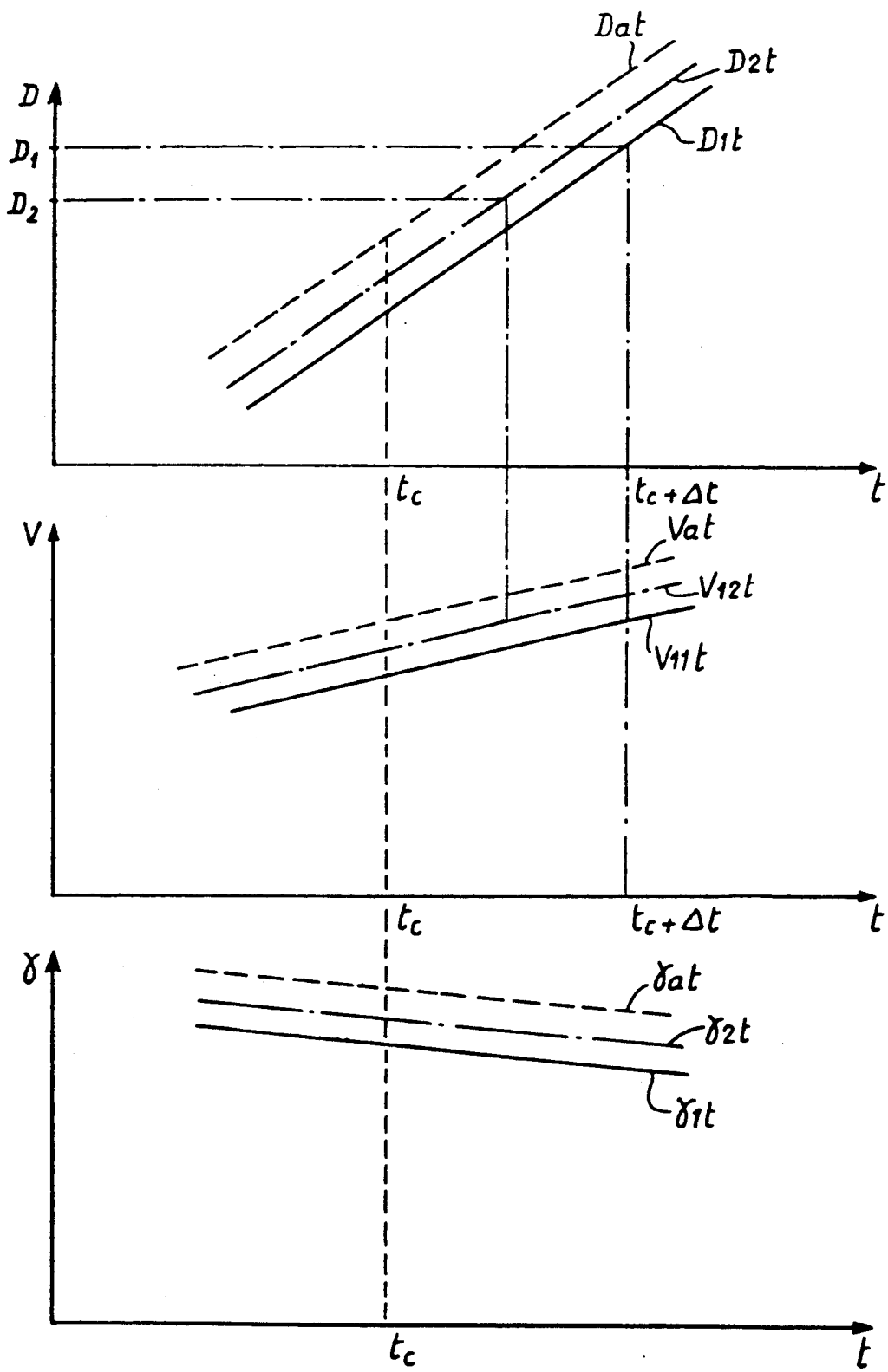
FIG. 5 shows the curves of the accelerations, speeds and distances used in the system of the invention close to a given take-off time.

With reference to FIG. 5 showing the curves of the accelerations, speeds and distances used in the system of the invention, close to one moment of take-off tc, it can be seen that, in this examples of a situation resulting from an anomaly occuring during take-off, the real acceleration $\gamma_1 t$ is less than the theoretical acceleration $\gamma$ at, the real speed $V_{11}t$ being less than the theoretical speed Vat which, as shown by the curve of the real speed $V_{11}t$, would be reached at the moment $tc + \Delta t$, the curve $D_1t$ making it moreover possible to forecast what the distance covered by the aircraft would be at this moment.

Knowing the margin tolerated in the calculation of the theoretical take-off distance, it is therefore a simple matter to inform the pilot when this margin is exceeded by simply comparing the theoretical distance with the forecast distance.

It would be proper to emphasize that, although the margin is calculated for the critical speed $V_1$ so that the brakes absorb the entire energy $\frac{1}{2}mV_1^2$ before the end of the runway, the system is designed in such a way that the pilot shall be continuously informed, well before $V_1$, of his current position. Thus, the pilot shall be warned with an additional "energy margin" enabling him to decide on whether or not to continue the take-off procedure or stop the aircraft.

Similar comments apply to realizable distances, speeds and accelerations.

What is claimed is:

1. System for generating on board an aircraft an alarm signal should an anomaly occur during take-off, before the aircraft reaches a critical travelling speed until which the take-off precedure can be modified or interrupted and beyond which take-off must be continued, wherein said system comprises:

means able to deliver signals representative of the theoretical acceleration, real acceleration, theoretical speed, real speed, theoretical distance, and real distance of the aircraft at a given moment, means to calculate the expression:

$$D_1 = D_1 t + (Vat^2 - V_{11}t^2)/2\gamma_1 t$$

in which:

$\gamma_1 t$ is the real acceleration of the aircraft at the moment t, $V_{11}t$ is the real speed of the aircraft at the moment t, Vat is the theoretical speed of the aircraft at the moment t, $D_1 t$ is the real distance covered by the aircraft at the moment t, $D_1$ is the real forecast distance covered by the aircraft when $V_{11}t$ shall be equal to Vat, as well as the ratio:

$D_1/D_{at}$ in which:

$D_1$ is as defined above, and $D_{at}$ is the theoretical distance covered by the aircraft at the moment t, means for comparing the $D_1/D_{at}$ ratio with a predetermined threshold S guaranteeing a minimum safety distance for the braking and stopping of the aircraft, and for providing an information signal to alarm means able to emit an alarm signal when said ratio $D_1/D_{at}$ exceeds or equals said threshold.

2. System of claim 1, further including:

means able to deliver signals representative of the realizable acceleration, realizable speed and realizable distance of the aircraft at a given moment, means to calculate the expression:

$$D_2 = D_2t + (V_{at}^2 - V_{12t}^2)/2\gamma_1 t$$

in which:

$V_{12t}$ is the realizable speed of the aircraft at the moment t, $D_2t$ is the realizable distance covered by the aircraft at the moment t, and $D_2$ is the forecast realizable distance covered by the aircraft when $V_{12t}$ shall equal $V_{at}$, as well as the ratio:

$D_2/D_{at}$ in which:

$D_2$ is as defined above, and means for comparing the ratio $D_2/D_{at}$ with a predetermined threshold S guaranteeing a minimum safety distance for the braking and stopping of the aircraft, and for providing an information signal to alarm means to emit an alarm signal when said ratio $D_2/D_{at}$ exceeds or equals said threshold.

3. System according to claim 1 further including:

means for delivering signals representative of the aerodynamic speed of the aircraft at a given moment, means for determining the variation $\Delta W$ of the longitudinal component of the wind from the expression $$Wx = VTAS - V_{11}t.$$

in which $Wx$ is the longitudinal component of the wind,

VTAS is the aerodynamic speed, and $V_{11}t$ is the real speed of the aircraft, and means for comparing $\Delta W$ with a predetermined threshold value $\Delta WS$, said alarm means further being adapted to emit an alarm signal when $\Delta W$ equals or exceeds said threshold value $\Delta WS$.

4. System according to claim 1, wherein said threshold S, to which the ratio $D_1/D_{at}$ is compared, is variable and reduces when the difference $\Delta V$ between the critical speed and the speed reached by the aircraft reduces.

5. System according to claim 4, wherein said threshold S is defined by the function $S = a\Delta V + b$, a and b being constants.

6. System according to claim 1, wherein said system includes means for obtaining a set of numerical values of the theoretical, real and realizable accelerations and also the aerodynamic speed.

7. System according to claim 1, wherein said threshold S is variable and decreases when the difference $\Delta V$ between said critical speed and the speed reached by the aircraft decreases.

8. System according to claim 7, wherein said threshold S is defined by the function $S = a\Delta V + b$, a and b being constants.

* * * * *